US006450586B1

United States Patent
Nagano

(10) Patent No.: US 6,450,586 B1
(45) Date of Patent: Sep. 17, 2002

(54) BRAKE CONTROL APPARATUS CAPABLE OF PREVENTING WHEELS FROM LOCKING WITHOUT INCREASING A BRAKING TIME AND A BRAKING DISTANCE

(76) Inventor: Shigeru Nagano, 149 4-chome, Nakanishi-go, Gifu-shi, Gifu-ken (JP)

( * ) Notice: Subject to any disclaimer, the term of this patent is extended or adjusted under 35 U.S.C. 154(b) by 0 days.

(21) Appl. No.: 09/708,540

(22) Filed: Nov. 9, 2000

(30) Foreign Application Priority Data

Nov. 19, 1999 (JP) ............................................ 11-330253

(51) Int. Cl.$^7$ .......................... B60T 11/06; B60T 13/12; F16P 55/224; F16P 55/26
(52) U.S. Cl. ........................ 303/2; 188/72.5; 188/73.2; 303/113.1
(58) Field of Search ............................ 303/113.1, 72.5, 303/73.2, 2, 3, 9

(56) References Cited

U.S. PATENT DOCUMENTS

| | | | |
|---|---|---|---|
| 4,660,683 A | * 4/1987 | Hayashi et al. ............ | 188/18 A |
| 5,168,963 A | * 12/1992 | Poncini ...................... | 188/72.5 |
| 5,273,346 A | * 12/1993 | Tsuchida et al. .............. | 303/2 |
| 5,700,067 A | * 12/1997 | Heubner ..................... | 303/9 |
| 5,749,633 A | * 5/1998 | Baumgartner ............ | 303/113.1 |

* cited by examiner

Primary Examiner—Matthew C. Graham
(74) Attorney, Agent, or Firm—Shlesinger, Arkwright & Garvey LLP

(57) ABSTRACT

A brake control apparatus comprises a brake disk, a main brake mechanism, a subsidiary brake mechanism, a wheel speed sensor, and a control device. The brake disk rotates with a wheel. The main brake mechanism and the subsidiary brake mechanism press a main pad and a subsidiary pad to the brake disk on the basis of an operation of a brake pedal, respectively, to apply a brake to a wheel. The control device detects whether or not the wheel becomes an instant condition preceding a locking or an initial condition of the locking, in accordance with a detected result of the wheel speed sensor. When the wheel becomes the instant condition preceding the locking or the initial condition of the locking, the control device controls the main brake mechanism to make the main brake mechanism temporarily reduce the press force of the subsidiary pad. During the operation of the brake pedal, the control device controls the subsidiary brake mechanism to make the subsidiary brake mechanism repeat a variation cycle before the wheel becomes the instant condition preceding the locking or the initial condition of the locking. In the variation cycle, the press force of the subsidiary pad increases after reduction. As a result, it is possible to prevent the wheel from locking without increasing a braking time duration and a braking distance.

22 Claims, 7 Drawing Sheets

BRAKE CONTROL APPARATUS CAPABLE OF PREVENTING WHEELS FROM LOCKING WITHOUT INCREASING A BRAKING TIME AND A BRAKING DISTANCE

BACKGROUND OF THE INVENTION

This invention relates to a brake control apparatus for use in a vehicle such as a automobile, and more particularly, to a brake control apparatus for controlling a pressure force of a brake pad in accordance with rotation of wheels to prevent the wheels from locking in a vehicle which presses the brake pad to a brake disk in accordance with a braking operation to brake the wheels.

In general, a disc brake is known which applies a brake to wheels by friction between a braking pad and a brake disk in a vehicle such as an automobile. More particularly, actuation of a brake pedal is transmitted to a caliper with the aid of a pressure of brake oil on applying the brake to the wheels in the vehicle, in order to press the brake pad to the brake disk. As a result, the brake disc applies the brake to the wheels in accordance with the friction between the brake pad and the brake disk.

On the other hand, it will be assumed that a harsh braking is applied in the vehicle when the vehicle runs on a slippery road surface on the basis of rainfall or snowfall. The wheels of the vehicle may become a locking state when a braking force exceeds a friction force between the wheels and a road surface. The locking state means that the wheels stops rotating but a car body runs forward. In case where locked wheels are front wheels, it is difficult to steer the vehicle. In case where the locked wheels are rear wheels, an attitude of the car body becomes unstable.

Under the circumstances, a sort of anti-lock brake apparatuses are developed and are realized. In each of the anti-lock brake apparatuses, the wheels are prevented from locking by brake actuation such as a pumping brake actuation to keep a steering ability and to make the attitude of the car body become stable. More specifically, the brake oil pressure is decreased at once in order that the pressure force of the brake pad reduces to the brake disk in a conventional one of the anti-lock brake apparatuses, when detection is made at the instant preceding the locking of the wheels or at the initial locking of wheels. When the pressure force of the brake pad reduces to the brake disk, the braking force is slightly less than a friction force between the road surface and the wheels. As a result, the wheels return to rotate. After that, the brake oil pressure is increased in order to increase the pressure force of the brake pad. A cycle is repeated in which the pressure force of the brake pad is decreased and is increased. As a result, the lock of the wheels is released.

However, the conventional anti-brake apparatus uses, as the brake pad of the ant-brake, the brake pad, which is used in a usual brake operation in order to carry out the anti-brake operation. Therefore, it is impossible to carry out both of the usual brake operation and the anti-brake operation at the same time in the conventional anti-brake apparatus although it is possible to carry out either one of the usual brake operation and the anti-brake operation. In this event, the usual brake operation is carried out at first in the conventional anti-brake apparatus when the brake pedal is pressed. When detection is made at the instant preceding the locking of the wheels or at the initial locking of wheels, the usual brake operation is turned into the anti-brake operation in the conventional ant-brake apparatus. Therefore, it is difficult to prevent the wheels from locking although if it is possible to early release the wheels from locking in the conventional anti-brake apparatus. When the timing is advanced at which the usual brake operation is turned into the anti-brake operation, the duration of the usual brake operation becomes short. As a result, the braking time duration becomes long and the braking distance also becomes long.

In addition, a force, which produced on the basis of variation of the oil pressure in the caliper, is transmitted to the brake pedal when the conventional anti-brake apparatus. Such a transmission will be called a kickback. As a result, the brake pedal vibrates with quick steps. Inasmuch as the brake pedal vibrates with quick steps in no concern to the driver's intension, the driver has unmoral feeling. Even if a light or a sound sends a notice when the kickback occurs, it is difficult for the driver to remove the unmoral feeling.

SUMMARY OF THE INVENTION

It is therefore an object of this invention to provide a brake control apparatus capable of preventing the wheels from locking without increasing braking time duration and a braking distance.

It is another object of this invention to provide a brake control apparatus capable of preventing the occurrence of a kickback.

Other objects of this invention will become clear as the description proceeds.

According to a first aspect of this invention, there is provided a brake control apparatus comprising a brake disk rotating with a wheel, a main brake mechanism for pressing a main friction member to the brake disk in accordance with an operation of a brake operating member to brake the wheel, lock detecting means for detecting whether or not the wheel becomes an instant condition preceding a locking or an initial condition of the locking to produce a lock detection signal when the wheel becomes the instant condition preceding the locking or the initial condition of the locking, main brake control means for controlling the main brake mechanism to make the main brake mechanism temporarily reduce a main press force which is applied from the main friction member to the brake disk. The brake control apparatus comprises a subsidiary brake mechanism for pressing a subsidiary friction member to the brake disk to brake the wheel and first subsidiary brake control means for controlling the subsidiary brake mechanism to make the subsidiary brake mechanism repeat a variation cycle during the operation of the brake operating member before the first subsidiary brake control means receives the lock detection signal. The subsidiary brake mechanism increases a subsidiary press force after reducing the subsidiary press force in the variation cycle. The subsidiary press force is applied from the subsidiary friction member to the brake disk.

When operating the brake-operating member, the main brake mechanism makes presses the main friction member to the brake disk, which rotates with the wheel, in accordance with the operation of the brake-operating member. On the basis of the friction between the brake disk and the main friction member that is based on the press, the rotation of the wheel is stopped. When the braking force becomes greater than the friction force between the wheel and the road surface and when the wheel becomes the instant condition preceding the locking or the initial condition of the locking, the lock detecting means detects that the wheel becomes the instant condition preceding the locking or the initial condition of the locking. The lock detecting means produces the lock detection signal. In accordance with the lock detection signal, the main brake control means controls the main brake mechanism. Under the control, the main press force of the main friction member increases after reducing temporarily. As a result, an ant-lock braking operation is carried out which is similar to a pumping brake operation.

By the way, first subsidiary brake control means controls the subsidiary brake mechanism during the operation of the brake operating member before the first subsidiary brake control means receives the lock detection signal. More particularly, the subsidiary brake mechanism repeats the variation cycle while the main friction member continues to be pressed to the brake disk, before the main brake control means starts controlling the main brake mechanism. The subsidiary press force increases after reduction. As readily understood from the above description, the wheel is supplied with a main braking force and a subsidiary braking force at the same time. The main braking force is based on an usual braking operation according to the main brake mechanism. The subsidiary braking force is based on an intermittent braking operation according to the subsidiary brake mechanism. The intermittent braking operation may be a pumping brake operation similar to the anti-lock braking operation. As a result, it is possible to hardly make an occurrence of locking in comparison to only the usual braking operation. In addition, a braking time duration and a braking distance do not become long inasmuch as a large braking force is applied to the wheel as compared with a timing operation at which the usual braking operation is switched to the anti-lock braking operation in an early stage.

According to a second aspect of this invention, the brake control apparatus further comprises brake operation detecting means for detecting the operation of the brake-operating member to produce a brake operating detection signal. The first subsidiary brake control means controls the subsidiary brake mechanism to make the subsidiary brake mechanism start the variation cycle when the first subsidiary brake control means receives the brake operating detection signal.

When the brake operation detecting means detects the operation of the brake operating member, the first subsidiary brake control means controls the subsidiary brake mechanism to make the subsidiary brake mechanism start the variation cycle. The first subsidiary brake control means makes the subsidiary brake mechanism carry out the intermittent braking operation with the main brake mechanism carrying out the usual braking operation based on the operation of the brake operating member.

According to a third aspect of this invention, the first subsidiary brake control means controls the subsidiary brake mechanism to make the subsidiary brake mechanism finish the variation cycle when the first subsidiary brake control means receives the lock detection signal.

When the lock detecting means detects that the wheel becomes the instant condition preceding the locking or the initial condition of the locking, the first subsidiary brake control means controls the subsidiary brake mechanism to make the subsidiary brake mechanism finish the variation cycle. The first subsidiary brake control means makes the subsidiary brake mechanism carry out the intermittent braking operation until the main brake mechanism finishes the usual braking operation based on the operation of the brake-operating member.

According to a fourth aspect of this invention, the brake control apparatus further comprises a second subsidiary brake control means for controlling the subsidiary brake mechanism to make the subsidiary brake mechanism repeat the variation cycle on receiving the lock detection signal before the main brake control means starts controlling the main brake mechanism after the first subsidiary brake control means finishes controlling the subsidiary brake mechanism.

After the first subsidiary brake control means finishes controlling the subsidiary brake mechanism, the second subsidiary brake control means for controlling the subsidiary brake mechanism in a following manner before the main brake control means starts controlling the main brake mechanism. When the lock detecting means detects that the wheel becomes the instant condition preceding the locking or the initial condition of the locking, the subsidiary brake mechanism increases the subsidiary press force of the subsidiary friction member after the subsidiary brake mechanism temporarily reduces the subsidiary press force of the subsidiary friction member. The variation cycle having the reduction and the increase of the subsidiary press force is repeated so that the subsidiary brake mechanism carries out the anti-lock braking operation. In other words, the instant when the lock detecting means detects that the wheel becomes the instant condition preceding the locking or the initial condition of the locking, the main brake mechanism does not carry out the anti-lock braking operation and the subsidiary brake mechanism carries out the anti-lock braking operation at first. After this, the main brake mechanism starts carrying out the anti-lock braking operation. Therefore, the anti-lock braking operation is carried out by the subsidiary brake mechanism at first in case where the braking force based on the subsidiary press force of the subsidiary friction member is less than the braking force based on the main press force of the main friction member. In case where the locking is not released by the above-mentioned operation, the anti-lock braking operation is carried out by the main brake mechanism.

According to a fifth aspect of this invention, the main brake mechanism comprises a main transmission tube for use in transmitting the main friction member with a fluid pressure based on the operation of the brake operating member. The subsidiary brake mechanism comprises a subsidiary transmission tube for use in transmitting the subsidiary friction member with the fluid pressure to operate the subsidiary friction member in accordance with the fluid pressure.

When the brake-operating member is operated, the operating force is transmitted to the main friction member through the main transmission tube by the fluid pressure. The main friction member is pressed to the brake disk on the basis of the transmitted fluid pressure so that the main friction member applies a brake to the wheel on the basis of the friction between the main friction member and the brake disk. In addition, the anti-lock braking operation is carried out by the main brake mechanism when the fluid pressure is varied which is applied to the main friction member. A reverse force based on the variation of the fluid pressure is also transmitted as a kickback to the brake-operating member.

On the other hand, the fluid pressure is applied to the subsidiary friction member through the subsidiary transmission tube during the operation of the brake-operating member. The subsidiary friction member is pressed to the brake disk on the basis of the transmitted fluid pressure so that the subsidiary friction member applies a brake to the wheel on the basis of the friction between the subsidiary friction member and the brake disk. Inasmuch as the subsidiary transmission tube is independent of the main transmission tube, the operating force of the brake-operating member is not directly applied to the subsidiary transmission tube. Therefore, the reverse force is not transmitted to the brake-operating member even if the fluid pressure varies. Furthermore, the reverse force based on the variation of the fluid pressure is not transmitted to the brake-operating member in a manner similar to the intermittent braking operation in case where the anti-lock braking operation is carried out by the subsidiary brake mechanism.

According to a sixth aspect of this invention, the brake control apparatus further comprises fluid pressure detecting means for detecting the fluid pressure in the main transmission tube to produce a pressure detection signal representative of the fluid pressure. The first subsidiary brake control means includes press force varying means for varying the subsidiary press force in accordance with the pressure detection signal.

In case where the first subsidiary brake control means controls the subsidiary brake mechanism, the fluid pressure is detected in the main transmission tube by the fluid pressure detecting means. The fluid pressure is different in accordance with the operation of the brake-operating member, which is operated by a driver. The fluid pressure is adjusted in the subsidiary transmission tube in accordance with the detected fluid pressure. The fluid pressure in the subsidiary transmission tube is applied to the subsidiary friction member. The subsidiary press force, which is applied from the subsidiary friction member to the brake disk, is based on the detected fluid pressure detected by the fluid pressure detecting means, namely, the operation of the brake operating member. Therefore, the subsidiary friction member is pressed to the brake disk by the subsidiary press force appropriate to an operating condition of the brake operating member which is operated by the driver, in case where the intermittent braking operation is carried out by the subsidiary brake mechanism, although the operating condition is different on the basis of the running condition of the vehicle. The operating condition may be, for example, an operating amount and/or operating speed.

According to a seventh aspect of this invention, the main friction member is positioned at a main region of the brake disk. The subsidiary friction member is positioned at an intermediate region of the brake disk. The intermediate region is different from the main region and an opposite region, which is opposed to the main region across a rotation center of the brake disk.

When the main friction member is pressed to the brake disk, the braking force is operated to a contact portion between the main friction member and the brake disk and another braking force is operated to the opposite region which is oppose to the main friction member across the rotation center of the brake disk, in order to balance the braking force. It will be assumed that the subsidiary friction member is positioned at the opposite region. The braking forces based on both of the main friction member and the subsidiary friction member are operated to a same region of the brake disk at the same time in case where the subsidiary friction member is pressed to the brake disk. On the basis of a synergistic effect based on both of the braking forces, an excessive force greater than a sum of both of the braking forces is operated to the brake disk. On the other hand, the subsidiary friction member is positioned a region apart from the opposite region in this invention. Therefore, both of the braking forces are scattered so that both of the braking forces are applied to the brake disk even if both of the main friction member and the subsidiary friction member are pressed to the brake disk at the same time. As a result, the force greater than the sum of both braking forces is not operated to the brake disk.

According to an eighth aspect of this invention, the subsidiary friction member is positioned near the opposite region in the intermediate region.

The subsidiary friction member is positioned apart from the main friction member in the intermediate region to be pressed to the brake disk. In the intermediate region, a region, at which the subsidiary friction member is not positioned, is always exposed to the atmosphere. The exposed region is used as a heat radiation region. The heat based on the friction between the main friction member and the brake disk or between the subsidiary friction member and the brake disk is dissipated from the heat radiation region to the atmosphere.

DESCRIPTION OF THE PREFERRED EMBODIMENT

Figure 1:
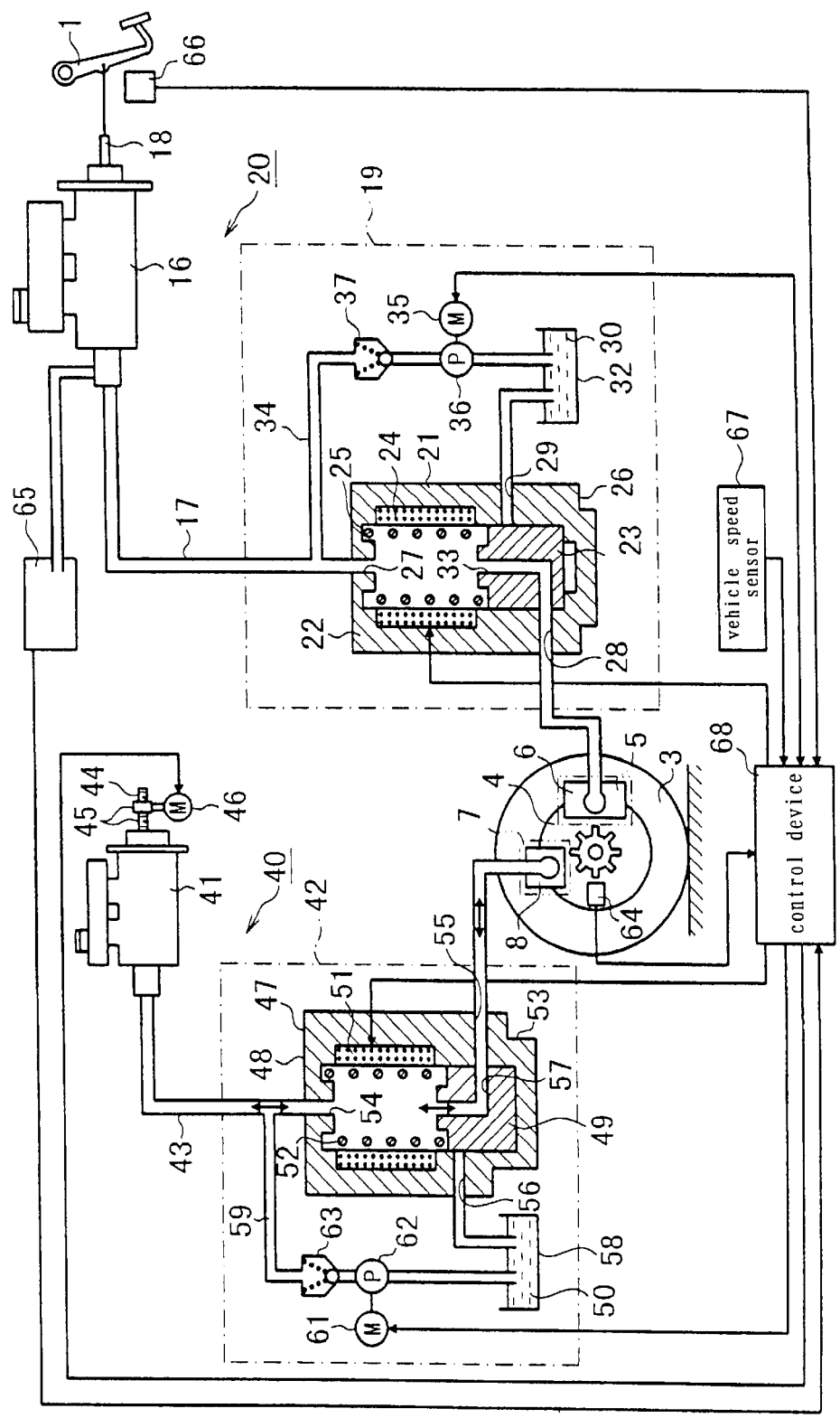
FIG. 1 is a diagram of a brake control apparatus of a preferred embodiment of this invention.

Referring to FIG. 1, description will be made as regards a brake control apparatus according a preferred embodiment of this invention. The illustrated brake control apparatus is for braking wheels in a vehicle such as an automobile. A brake pedal 1 is mounted near a driver seat. The brake pedal 1 is used as a brake-operating member. On the other hand, a plurality of wheels 3 are attached to a car body with a freedom of rotation, respectively. For example, four wheels 3 are attached to the car body with a freedom of rotation although only one wheel 3 is illustrated in FIG. 1 for convenience of description. In addition, a disk-shaped brake disk 4 is attached to each of the wheels 3 with rotating together with each wheel 3. The brake disk 4 may be called a disk rotor.

Main calipers 5 are attached to the car body so as to step over rims of brake disks 4, respectively. Each of the main calipers 5 has a structure similar to that of a caliper attached to a usual automobile. More particularly, the main caliper 5 comprises a cylinder, a piston held in the cylinder with reciprocation, and a main pad 6 positioned at a rim of the brake disk 4. The main pad 6 is contact with the brake disk 4 and is apart from the brake disk 4 in accordance with the reciprocation of the piston. The main pad 6 is used as a main friction member. When a fluid pressure is applied to the cylinder in the main caliper 5, the piston is pushed out so that the main pad 6 is contact with the brake disk 4 strongly. When the main pad 6 is contact with the brake disk 4 strongly, the brake is applied to each wheel 3 is stopped on the basis of the friction between the main pad 6 and the brake disk 4.

Figure 2:
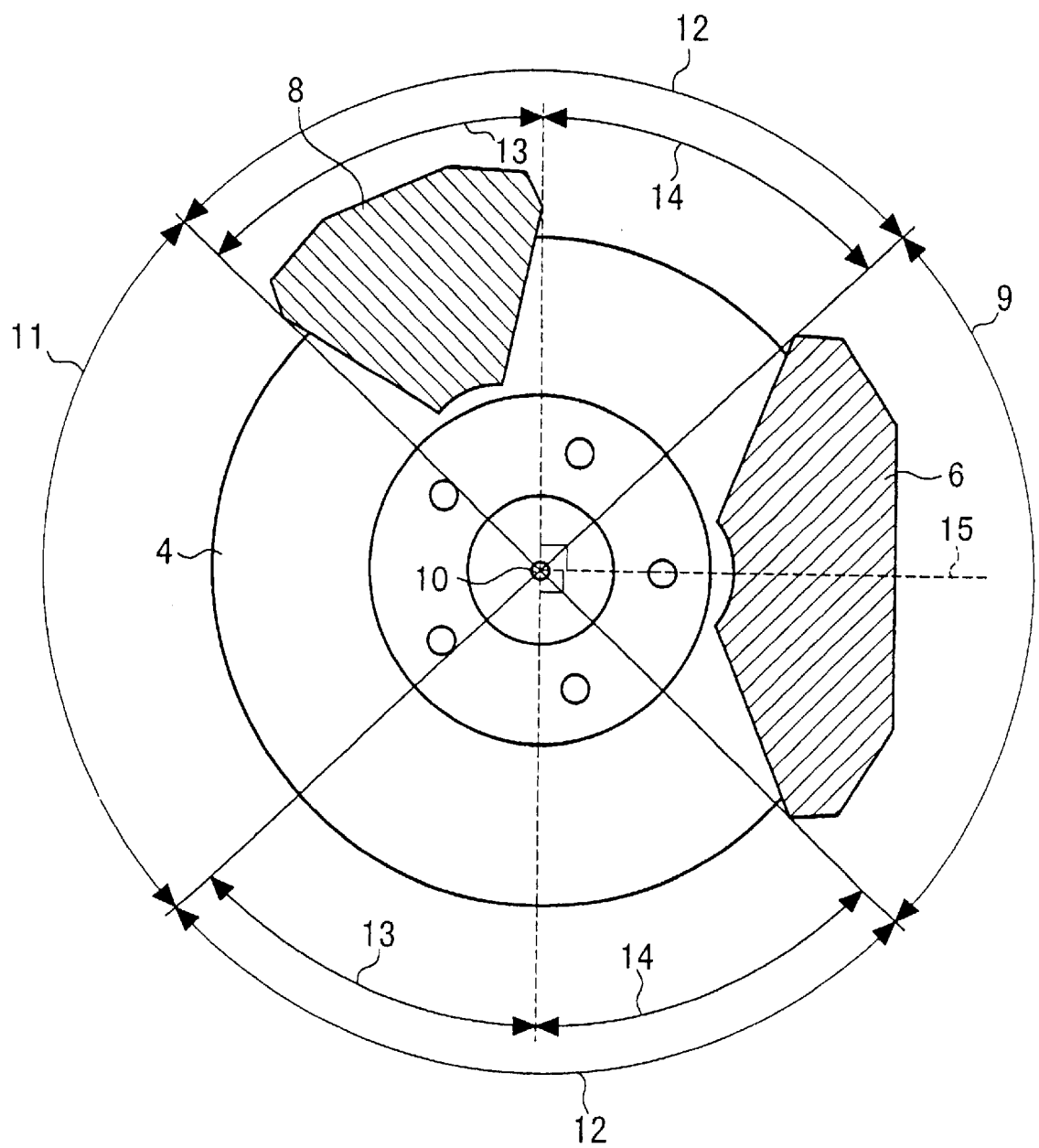
FIG. 2 shows a view for describing a relationship between a main pad and a subsidiary pad to a brake disk.

Subsidiary calipers 7 are attached to the car body so as to step over the rims of brake disks 4 at wheels 3, respectively. Each of the subsidiary calipers 7 has a structure similar to that of the main caliper 5 and has a subsidiary pad 8 which is used as a subsidiary fraction member. An area (brake effective area) concerned to the braking in each subsidiary pad 8 is smaller than the brake effective area of the main pad 6. For example, the brake effective area of the subsidiary pad 8 is equal to a half of the brake effective area of the main pad 6. As shown in FIG. 2, a region will be called "main pad positioning region 9" at which the main pad 6 is positioned in the brake disk 4. A region will be called "opposite region 11" which faces the region 9 across a rotation center 10 of the brake disk 4. Two regions except the regions 9 and 11 will be called "intermediate regions 12". Although the opposite region 11 is apart from the main pad 6, the braking force of the main pad 6 is applied to the opposite region 11. The subsidiary pad 8 is positioned at a region (subsidiary pad positioning region) near the opposite region 11 in one of the intermediate regions 12. As readily understood from the above description, the subsidiary pad 8 is positioned apart from the main pad 6. As a result it is possible to make the subsidiary pad 8 operate in no concern to the operation of the main pad 6. The region except the subsidiary pad-positioning region 13 is used as "heat sink region" in each of the intermediate regions 12. Two subsidiary pad-positioning regions 13 are formed on the brake disk 4. The subsidiary pad 8 may be positioned on either one of the subsidiary pad positioning regions 13.

In the example being illustrated, the subsidiary pad 8 is located so that the both ends of the subsidiary pad 8 are positioned at a region, which satisfies following conditions. More specifically, one end of the subsidiary pad 8 is positioned at a boundary between the opposite region 11 and the intermediate regions 12. Another end of the subsidiary pad 8 is positioned at a region having an angle of about a 90-degree to a basic line in case where the basic line is a line, which passes the rotation center 10 and a rotation center of the main pad 10.

As shown in FIG. 1, a pressure (fluid pressure) of a brake fluid 30 is used in order to transmit a depress actuation to the main pad 6 of each wheel 3, when the brake pedal 1 is depressed. More particularly, the brake pedal 1 is connected to a common main master cylinder 16 which converts the depress actuation into the fluid pressure. The main master cylinder 16 is connected to main transmission tubes 17 which are equal in number to the wheels 3. The main transmission tubes 17 are connected to the calipers 5, respectively.

The main master cylinder 16 has a structure similar to that of a master cylinder, which is used in a usual automobile. When the brake pedal 1 is depressed, a main push rod 18 makes the piston moves on against a return spring. When the piston moves on, a primary cup combined in the piston closes a fluid leak hole, which communicates with a reservoir tank. When the primary cup closes the fluid leak hole, the fluid pressure of the brake fluid 30 rises in the cylinder. When the fluid pressure overcomes a spring force of a small spring, which is positioned at an outlet of the brake fluid 30, a check valve is opened so that the brake fluid is supplied to each of the main transmission tubes 17. On the other hand, the piston returns back to an original position by the return spring and the check valve returns back by the spring when the d e press force is weakened to the brake pedal 1. As a result, the outlet of the brake fluid 30 is closed.

Main fluid pressure units 19 are positioned on the way of the main transmission tubes 17, respectively. Each of the main fluid pressure units 19 comprises a main solenoid valve 21 having a fixed core 22, a movable core (main plunger) 23, a solenoid 24, and a spring 25 all of which accommodate in a housing 26. The housing 26 has a first port 27, a second port 28, and a third port 29. The first port 27 is connected to the main master cylinder 16 through the main transmission tube 17. The first port 27 is always opened in no concern to the position of the main plunger 23. The second port 28 is connected to the main caliper 5 through the main transmission tube 17. The third port 29 is connected to a main reservoir 32. The main plunger 23 has an fluid path 33 and is accommodated in the housing 26 with reciprocation. The spring 25 always pushes the main plunger 23 so that the main plunger 23 goes away from the first port 27.

Figure 4A:
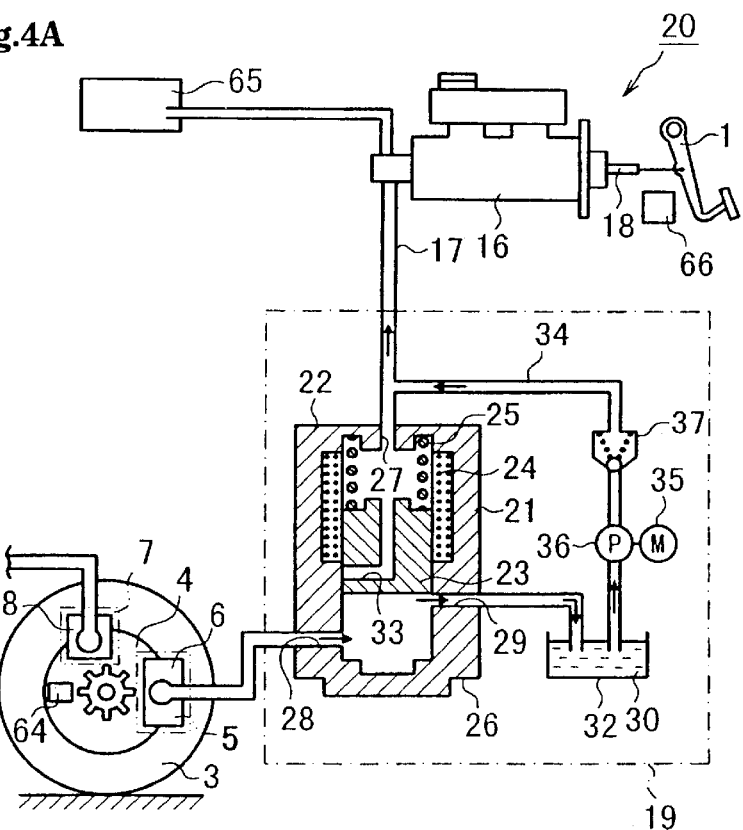
FIGS. 4A and 4B are diagrams for describing an operation of a main brake mechanism.
Figure 4B:
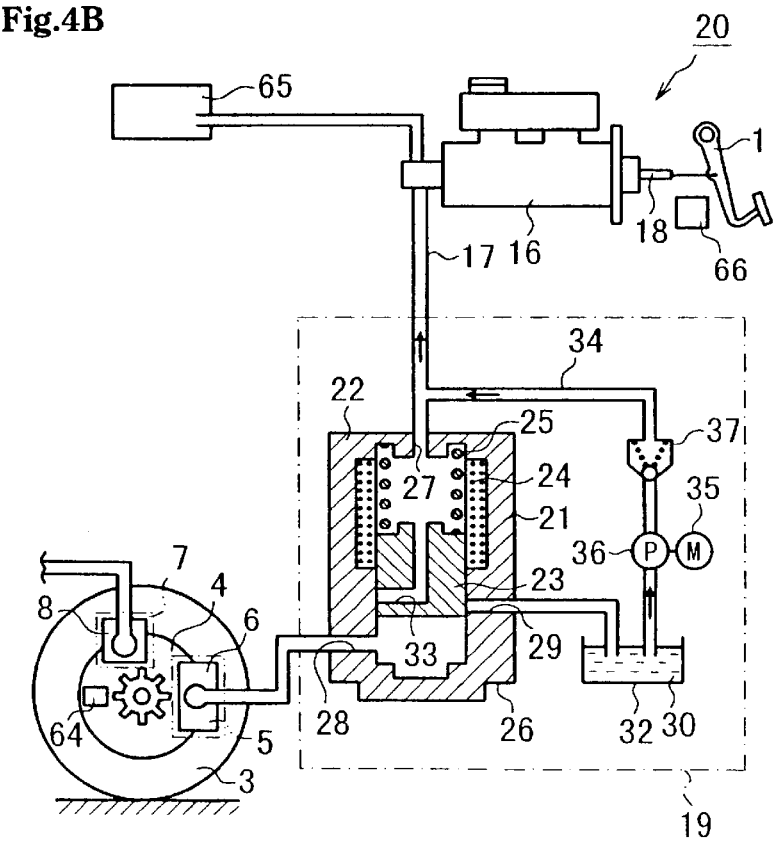

In the main solenoid valve 21, a magnetic suction force generates between the fixed core 22 and the main plunger 23 when the solenoid 24 is energized. A current is changed which is supplied to the solenoid 24, in order to adjust the magnetic suction force. The main solenoid valve 21 makes the main plunger 23 be positioned at any one of "basic position", "fluid pressure reducing position", and "fluid pressure holding position" against the spring 25, in order to open and close the second port 28 and the third port 29. In the basic position, the main plunger is apart from the first port 27 in maximum as shown in FIG. 1. The outlet of the fluid path 33 is coincident with the second port 28 and the third port 29 is closed. In the fluid pressure reducing position, the main plunger 23 is positioned above the basic position as shown in FIG. 4A. Both of the second port 28 and the third port 29 are opened. In the fluid pressure holding position, the main plunger 23 is positioned at a middle position between the basic position and the fluid pressure reducing position as shown in FIG. 4B. The second port 28 is opened and the third port 29 is closed.

As shown in FIG. 1, the main reservoir 32 is connected to the upper stream portion of the main solenoid valve 21 by a fluid pressure supplying tube 34 in each of the main transmission tubes 17. A main pump 36 and a check valve 37 are located on the way of the fluid pressure supplying tube 34. The main pump 36 is driven by a main motor 35 to supply main solenoid valve 21 with the brake fluid 30 of the main reservoir 32. The check valve 37 restricts the flow of the brake fluid 30 to one direction. A main brake mechanism 20 is constructed by the above-mentioned main master cylinder 16, the main transmission tubes 17, and the main fluid pressure units 19.

A subsidiary master cylinder 41, a subsidiary fluid pressure unit 42, and a subsidiary transmission tube 43 are mounted in correspondence to each of wheels 3 in order to operate each of the subsidiary pads 8. The subsidiary master cylinder 41 has a structure similar to that of the above-mentioned main master cylinder 16 except a following structure. Although the main push rod 18 is directly connected to the brake pedal 1 and the main push rod 18 is directly driven in the main master cylinder 16 when the brake pedal 1 is depressed, a subsidiary push rod 44 is connected to a power source through a transmission mechanism 45. A motor 46 is used as the power source. One of several types may be used as the transmission mechanism 45. For example, a rack is formed on the subsidiary push rod 44 and a pinion is attached to the rotating axis of the motor 46. The pinion is engages with the rack so that the rotating motion of the motor 46 is converted into a rectilinear motion, which is transmitted to the rack. The subsidiary push rod 44 may be reciprocated in accordance with the rectilinear motion.

The subsidiary transmission tubes 43 are perfectly independent to the main transmission tubes 17, respectively, in order that the subsidiary master cylinders 41 are connected to the subsidiary calipers 7, respectively. Each of the subsidiary fluid pressure unit 42 is for varying a fluid pressure of a brake fluid 50 that is transmitted to the subsidiary caliper 7. The subsidiary fluid pressure unit 42 is positioned on the way of the subsidiary transmission tube 43. Similar to each of the main fluid pressure units 19, each of the subsidiary fluid pressure units 42 comprises a subsidiary solenoid valve 47 having a fixed core 48, a movable core (subsidiary plunger) 49, a solenoid 51, and a spring 52 all of which accommodate in a housing 53. Similar to the each of the main fluid pressure units 19, the housing 53 has a first port 54, a second port 55, and a third port 56. The subsidiary plunger 49 has a fluid path 57. The third port 56 is connected to a subsidiary reservoir 58. A subsidiary pump 62 and a check valve 63 are mounted on the way of a fluid supplying tube 59. The subsidiary pump 52 is driven by a subsidiary motor 61. A subsidiary brake mechanism 40 is constructed by the above-mentioned subsidiary master cylinder 41, the subsidiary transmission tubes 43, and the subsidiary fluid pressure units 42.

A wheel speed sensor 64 is attached on the car body in each of wheels 3. Furthermore, a common pressure sensor 65, a common stop lump switch 66, and a common vehicle speed sensor 67 are attached on the car body, in order to detect a driving condition of the vehicle. The wheel speed sensor 64 is for use in detecting the rotating speed of the wheel3. The stop lump switch 66 is equivalent of a brake operation detecting section to detect whether or not the brake pedal 1 is depressed. The stop lump switch 66 is installed in the vehicle at the outset to make a stop lump turn on a light in synchronization with the brake pedal 1. The stop lump switch 66 produces a detection signal, which is used in the example being illustrated. The vehicle speed sensor 67 may be installed in a transmission to detect a driving speed. On detecting the driving speed, a lead-switch or a magnetic sensing element is driven by a magnet, which is rotated in accordance with a rotation of a gear in the transmission.

The pressure sensor 65 is for use in detecting the fluid pressure P of the brake fluid 30 that is based on the main master cylinder 16. Although one of several types may be used as the pressure sensor 65, it is desirable that the pressure sensor 65 can continuously detects the variation of the fluid pressure P. For example, the pressure sensor 65 has a structure similar to that of the above-mentioned main solenoid valve 21 and operates in a manner similar to the main solenoid valve 21, except following points. The pressure sensor 65 does not have a fluid path equivalent of the fluid path 33 of the main plunger 23. The pressure sensor 65 does not have a second port equivalent of the second port 28 of the housing 26 and a third port equivalent of the third port 29 of the housing 26. In the main solenoid valve 21, a predetermined current is supplied to the solenoid 24. The main plunger 23 is reciprocated on the basis of the fluid pressure in order to detect the voltage of the solenoid 24 that is varied in accordance with the reciprocation of the main plunger 23. Although the fluid pressure is calculated in accordance with the detected value in the main solenoid valve 21, the pressure sensor 65 does not carry out the above-mentioned operation. One of a Bourdon tube type pressure sensor, a bellows type pressure sensor, and a diaphragm type pressure sensor, which are well-known, may be used instead of the above-mentioned type.

A control device 68 is for use in controlling the motors 35, 46, and 61 and the solenoid valves 21 and 47 in accordance with the detected values of the sensors 64, 65, and 67 and the switch 66. The control device comprises a read-only memory (ROM), a central processing unit (CPU), and a random access memory (RAM). The ROM stores a predetermined control program and initial data. The CPU carries out a sort of arithmetic processing on the basis of the control program memorized in the ROM. The RAM temporarily stores the arithmetic results, which is calculated by the CPU.

Figure 5:
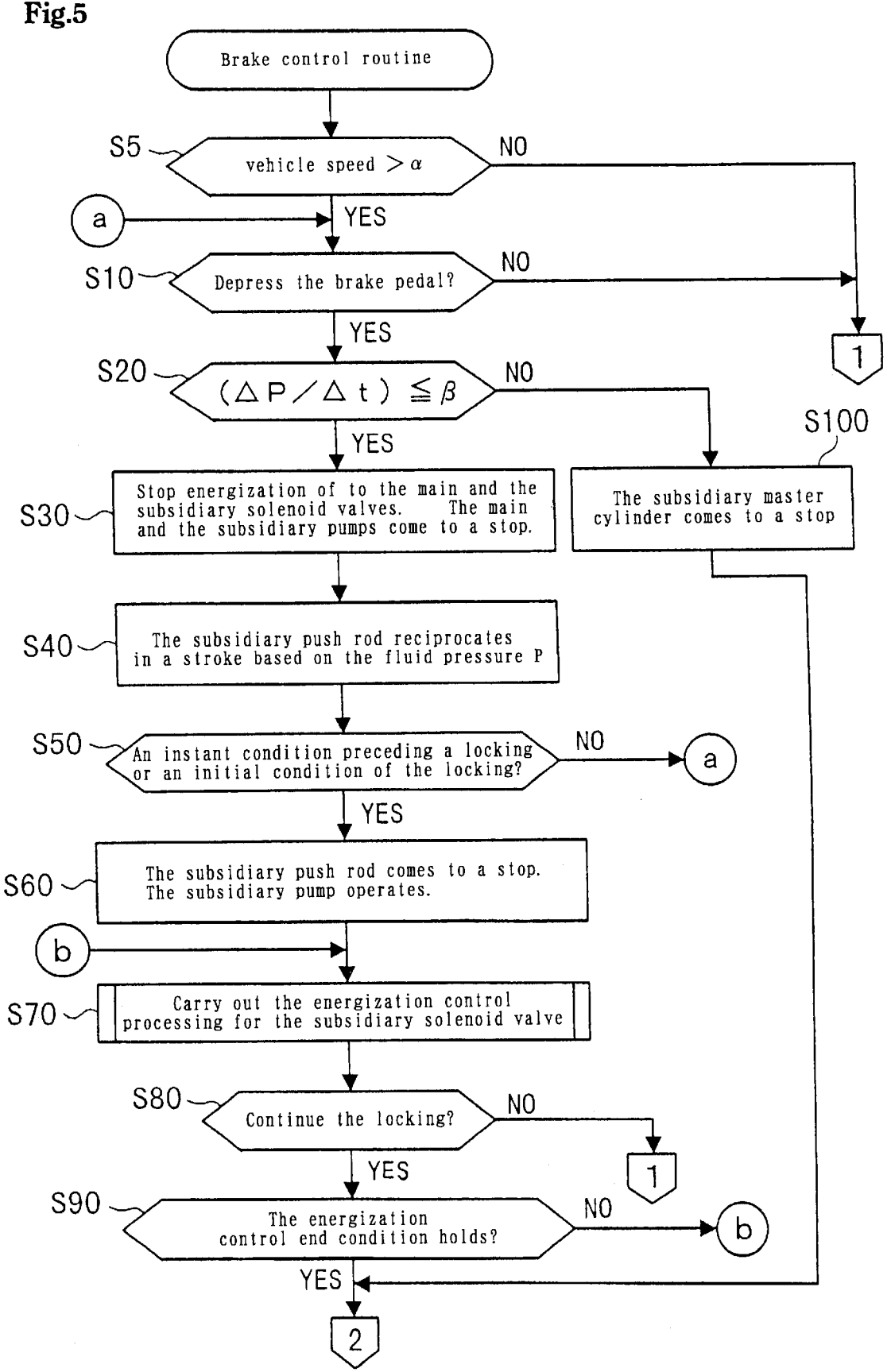
FIG. 5 is a flow chart for describing a brake control routine.
Figure 6:
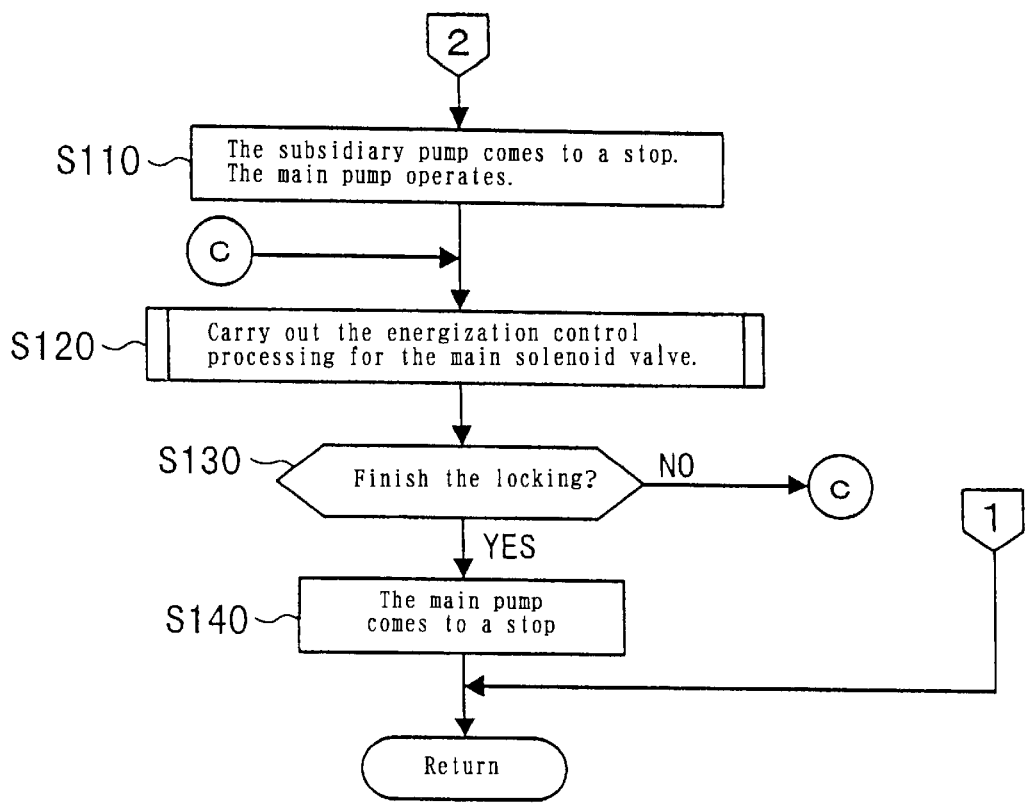
FIG. 6 is a flow chart for describing a brake control routine.
Figure 7:
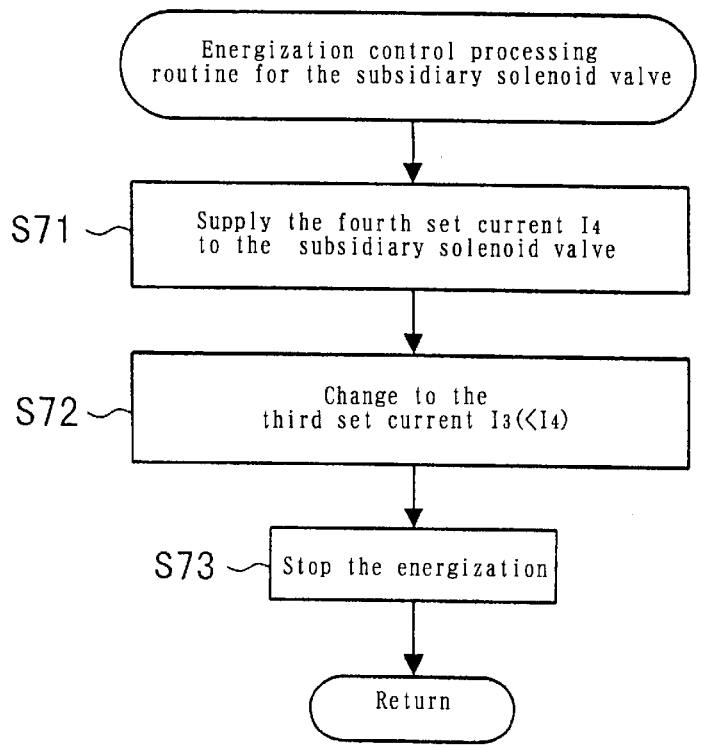
FIG. 7 is a flow chart for describing an energizing control routine of a subsidiary solenoid valve.
Figure 8:
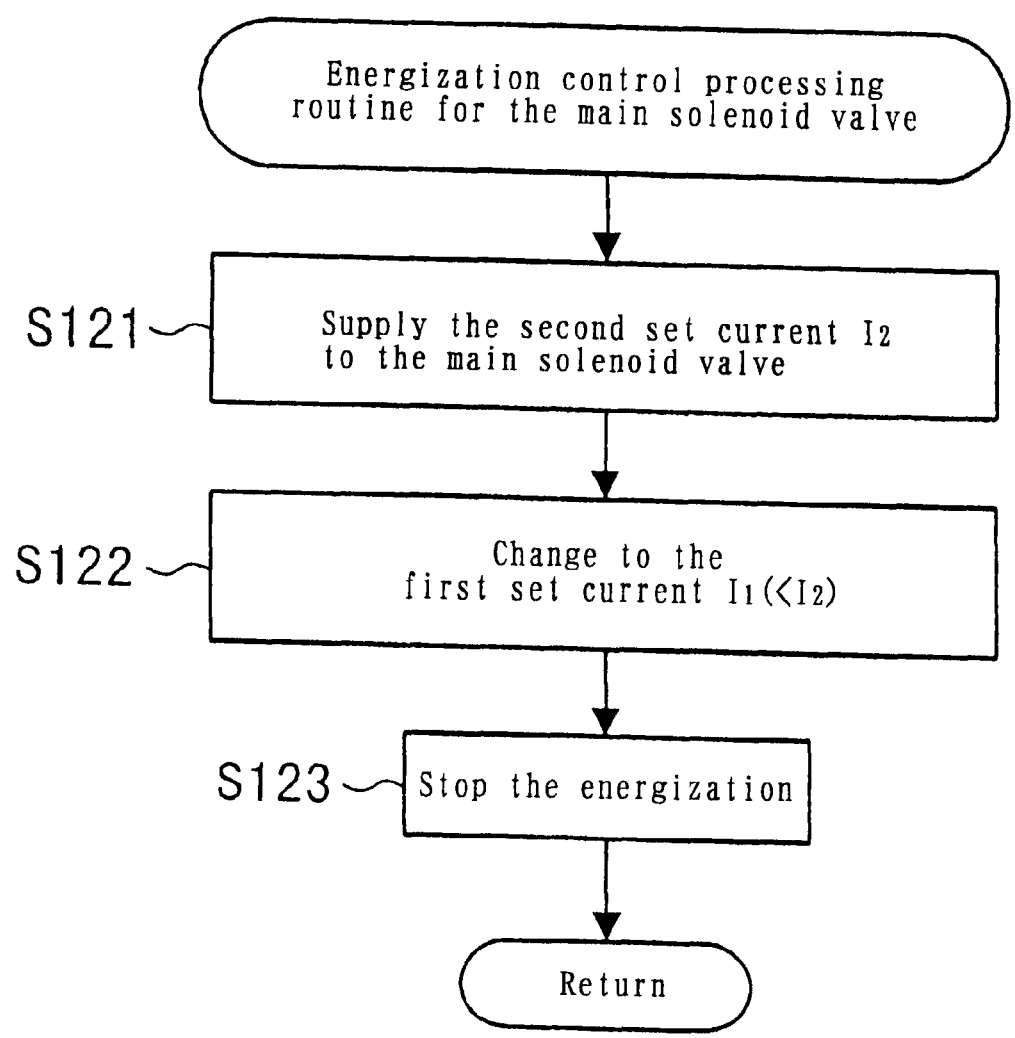
FIG. 8 is a flow chart for describing an energizing control routine of a main solenoid valve.

Referring to FIGS. 5 to 8, description will proceed to an operation of the brake control apparatus according to the preferred embodiment of this invention. FIGS. 5 and 6 shows a brake control routines for controlling the main and the subsidiary brake mechanisms 20 and 40, which are controlled by the control device 68. In addition, FIGS. 7 and 8 shows sub-routines carried out in the brake control routines.

In the brake control routines, the control device 68 judges whether or not it is necessary to carry out an ABS operation and an intermittent brake operation in a step S5. The ABS operation and the intermittent brake operation will be described later. More particularly, the control device 68 judges whether or not the vehicle speed detected by the vehicle speed sensor 67 is greater than a predetermined speed value. The predetermined speed value is a relatively small value. For example, the predetermined speed value is set as a judgment condition to 10 km/h. When the judgment condition is not satisfied, the control device 68 makes the brake control routines come to an end. More specifically, the control device 68 makes the brake control routines come to the end when the vehicle runs at a low speed or when the vehicle stops. When the judgment condition is satisfied, the step S5 proceeds to a step S10. More particularly, the step S5 proceeds to a step S10 when the vehicle runs at a speed, which is not less than a predetermined speed.

By the way, it is unnecessary to carry out the ABS operation and the intermittent brake operation when the brake pedal 1 is depressed in a vehicle, which carries, for example, an automatic transmission with a torque converter, in order to prevent a creep phenomenon. The creep phenomenon means that the vehicle moves slowly without pressing down on an accelerator when a shift lever is positioned at a driving position. In addition, it is unnecessary to carry out the ABS operation and the intermittent braking operation inasmuch as the time duration for stop is very short on operating the brake at a low speed such as about 10 km/h.

In the step S10, the control device 68 judges whether or not the brake pedal 1 is depressed, on the basis of a detected result detected by the stop lump switch 66. When the step S10 is not satisfied, the control device 68 makes the brake control routines come to the end. When the step S10 is satisfied, the control device 68 calculates a variation value (P/t) of the fluid pressure P per unit of time at a step S20, on the basis of the fluid pressure P which is detected by the pressure sensor 65. The control device 68 judges whether or not the variation value is not greater than a predetermined variation value . Namely, the control device 68 judges whether or not the fluid pressure P suddenly varies on the basis of a harsh braking.

In case where the step S20 is not satisfied (when the harsh braking is carried out), the control device 68 stops supplying the current to the motor 46 at a step S100, in order to stop a motion of the subsidiary push rod 44 in the subsidiary master cylinder 41. After that, the step S100 proceeds to a step S110. On the other hand, the control device 68 stops supplying the current to both of the main and the subsidiary solenoid valves 21 and 22 and stops both of the min and the subsidiary motors 35 and 61 at a step S30, in case where the step S20 is satisfied (when the harsh braking is not carried out). As a result, the both of the main and the subsidiary plungers 23 and 49 stop at the basic position (referring to FIG. 1), respectively. The third ports 29 and 56 are closed by the main and the subsidiary plungers 23 and 49, respectively. The second ports 28 and 55 are coincident with outlets of the fluid paths 33 and 57, respectively. An interception is carried out at a location between the second ports 28 and 55 and third ports 29 and 56. As a result, it is impossible for the brake fluids 30 and 50 to flow between the calipers 5 and 7 and the reservoirs 32 and 58. The first ports 27 and 54 communicate with the second ports 28 and 55.

As readily understood from the above description, the main caliper 5 is supplied with the fluid pressure P based on a depressed amount of brake pedal 1, through the main transmission tube 17. The main pad 6 is pressed to the brake disk 4 by a press force based on the depressed amount of brake pedal 1. The brake is applied to the wheel 3 the basis of friction between the main pad 6 and the brake disk 4 that is based on the press force. Inasmuch as the main pump 36 stops, the brake fluid 30 of the main reservoir 32 is not supplied to the main transmission tube 17 through the fluid pressure supplying tube 34. In addition, the brake fluid 30 of the main transmission tube 17 does not return back to the main reservoir 32 by the check valve 37.

At a step S40, the control device 68 supplies the current to the motor 46 during a predetermined time duration. After that, the control device 68 stops supplying the current to the motor 46 during the predetermined time duration. The control device 68 repeats a supplying cycle having a current supply and a current stop. Namely, the control device 68 intermittently supplies the current to the motor 46. In the supplying cycle, the control device 68 supplies the motor 46 with the current in comparison to the detected fluid pressure P detected by the pressure sensor 65. The motor 46 rotates in accordance with the supplied current. The rotation of the motor 46 is transmitted to the subsidiary push rod 44 through the transmission mechanism 45. On the basis of the rotation of the motor 46, the subsidiary push rod 44 makes the piston move on against the return spring in a manner similar to the brake pedal 1. In case where the control device 68 stops supplying the current to the motor 46, the piston returns back to an initial position by the force of the return spring. As a result, the subsidiary push rod 44 is automatically backed off. This retreat motion is transmitted to the motor 46 through the transmission mechanism 45 so as to reverse the rotation of the motor 46. The fluid pressure repeats to vary in accordance with reciprocation of the piston that is based on the supplying cycle.

The variation of the fluid pressure is transmitted to the subsidiary caliper 7 through the subsidiary transmission tube 43. The increases the press force applied to the brake disk 4, after the subsidiary pad 8 reduces the press force for a moment. A variation cycle is repeated which has a press force reduction and a press force increase. On the basis of the variation cycle, a brake operation (which will be called an intermittent brake operation) is carried out which is similar to an anti-lock brake operation (will be called the ABS operation). The intermittent brake operation may be called a pumping brake operation similar to the ABS operation. During the variation cycle, the brake is applied to the vehicle on the basis of the press force of the above-mentioned main pad 6. Furthermore, the subsidiary pad 8 is intermittently pressed to the brake disk 4 in accordance with the press force based on the fluid pressure P. Namely, the subsidiary pad 8 is intermittently pressed to the brake disk 4 in accordance with the press force based on the depression of the brake pedal 1.

At a step S50, the control device 68 judges whether or not each wheel 3 becomes a instant condition preceding the locking or an initial condition of the locking, in accordance with a detected value of each vehicle speed sensor 64. A judgment method uses any one of first through fourth methods. The first method uses only wheel reduction speed as a control parameter. The second method uses only slippery rate as the control parameter. The third method uses the wheel reduction speed and a wheel acceleration speed as the control parameter. The fourth method uses the wheel reduction speed, the wheel acceleration speed, and the slippery rate as the control parameter. For example, a wheel speed is converted into the wheel reduction speed by differentiation in the first method. In case where the wheel reduction speed is less than a predetermined reduction value, the control device 68 judges that each wheel 3 becomes the instant condition preceding the locking or the initial condition of the locking. More particularly, the control device 68 judges that each wheel 3 becomes the instant condition preceding the locking or the initial condition of the locking in case where the wheel speed suddenly reduces. In the second method, the control device 68 calculates a speed difference between a car body speed (or its approximate value) and a wheel speed. The control device 68 divides the speed difference by car body speed (or its approximate value) to obtain the slippery rate. In case where the slippery rate is greater than a predetermined slippery value, the control device 68 judges that each wheel 3 becomes the instant condition preceding the locking or the initial condition of the locking.

When the step S50 is not satisfied, the step S50 returns back to the step S10. When the step S50 is satisfied, he control device 68 stops supplying the current to the motor 46 at a step S60. When the control device 68 stops supplying the current to the motor 46, the subsidiary push rod 44 stops the reciprocation in the subsidiary master cylinder 41. The intermittent brake operation finishes which is based on the variation cycle of the press force of the subsidiary pad 8. In addition, the subsidiary motor 61 is supplied with the current at the step S60 in order to drive the subsidiary pump 62.

Figure 3A:
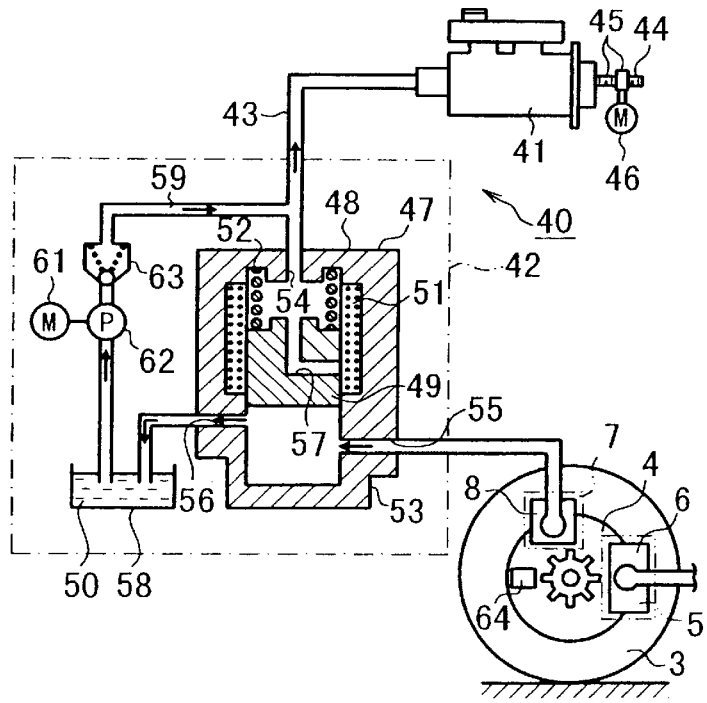
FIGS. 3A and 3B are diagrams for describing an operation of a subsidiary brake mechanism.

At a step S70, the control device 68 controls the subsidiary solenoid valve 47 to supply the subsidiary solenoid valve 47 with the current. More particularly, the subsidiary solenoid valve 47 is supplied with a fourth set current I4 at a step S71 shown in FIG. 7. The subsidiary plunger 49 is moved to the fluid pressure reduction position. At the fluid pressure reduction position, the tube is intercepted between the subsidiary master cylinder 41 and the subsidiary caliper 7 as shown in FIG. 3A. The tube is opened between the subsidiary caliper 7 and the subsidiary reservoir 58. As shown at an arrow in FIG. 3A, the brake fluid 50 of the subsidiary caliper 7 flows to the subsidiary reservoir 58 so that the fluid pressure reduces. At that time, the brake fluid 50 of the subsidiary reservoir 58 becomes a high pressure by the subsidiary pump 62 in accordance with the process of the above-mentioned step S60 to be returned to the side of the subsidiary master cylinder 41 (the upper stream of the subsidiary solenoid valve 47).

Figure 3B:
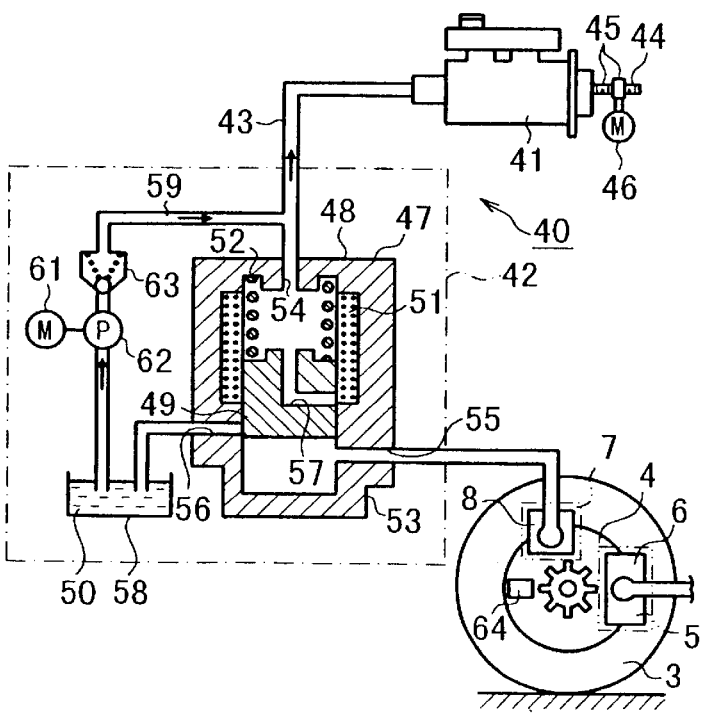

At a step S72, a third set current I3 is supplied to the subsidiary solenoid valve 47. The third set current I3 is less than the fourth set current I4. As shown in FIG. 3B, the subsidiary plunger 49 is moved to the fluid pressure holding position. At the fluid pressure holding position, the outlet of the fluid path 57 is depart from the second port 55 so that the second port 55 is opened. On the other hand, the third port 56 is closed. The tube is intercepted between the subsidiary master cylinder 41 and the subsidiary caliper 7. Furthermore, the tube is intercepted between the subsidiary caliper 7 and the subsidiary reservoir 58. As a result, the fluid pressure is held.

At a step S73, the control device 68 stops supplying the current to the subsidiary solenoid valve 47. The subsidiary plunger 49 returns back to the basic position and the tube is again opened between the subsidiary master cylinder 41 and the subsidiary caliper 7. The high pressure brake fluid 50 of the subsidiary master cylinder 41 again flows into the subsidiary caliper 7. Furthermore, the brake fluid 50 exhausted from the subsidiary pump 62 again flows into the subsidiary caliper 7. As a result, the fluid pressure increases. As described above, the press force of the subsidiary pad 8 increases after the press force of the subsidiary pad 8 reduces for a moment in the occurrence of the instant condition preceding the locking or the initial condition of the locking, in order to carry out so-called ABS operation. After the process of the step S73, the step S73 proceeds to a step S80.

At the step S80, the control device 68 judges whether or not each wheel 3 continuously is in the instant condition preceding the locking or the initial condition of the locking in a manner similar to the step S50. When the step S80 is not satisfied, the brake control routines finish. When the step S80 is satisfied, the control device 68 judges whether or not a predetermined energization control end condition is established at a step S90. For example, the predetermined energization control end condition is established when the energization control processing of the step S70 is repeated in a predetermined number. Furthermore, the predetermined energization control end condition is established when a predetermined time duration lapses from start of the first energization control processing of the step S70. When the step S90 is not satisfied, the step S90 returns back to the step S70. When the step S90 is satisfied, the step S90 proceeds to a step S110.

As described above, the step S90 or the step S100 may proceed to the step S110. At the step S110, the control device 68 makes the subsidiary motor 61 stop and drives the main motor 35. By the stop of the subsidiary motor 61, the high-pressure brake fluid 50 of the subsidiary pump 62 is not returned to the side of the subsidiary master cylinder 41 (subsidiary solenoid valve 47). At that time, the subsidiary push rod 44 is returned by the energization stop of the motor 46. As a result, the subsidiary pad 8 is not contact with the brake disk 4 strongly. The brake force reduces or vanishes which is applied from the subsidiary pad 8 to the brake disk 4.

At a step S120, the control device 68 controls the main solenoid valve 21 to supply the main solenoid valve 21 with the current in a manner similar to the step S70. More particularly, the main solenoid valve 21 is supplied with a second set current I2 at a step S121 shown in FIG. 8. The main plunger 23 is moved to the fluid pressure reduction position as shown in FIG. 4A. At the fluid pressure reduction position, the tube is intercepted between the main master cylinder 16 and the main caliper 5. The tube is opened between the main caliper 5 and the main reservoir 32. The brake fluid 30 of the main caliper 5 flows to the main reservoir 32 so that the fluid pressure reduces. At that time, the brake fluid 30 of the main reservoir 32 becomes a high pressure by the main pump 36 in accordance with the process of the above-mentioned step S110 to be returned to the side of the main master cylinder 16 (the upper stream of the main solenoid valve 21).

At a step S122, a first set current I1 is supplied to the main solenoid valve 21. The first set current I1 is less than the second set current I2. As shown in FIG. 4B, the main plunger 23 is moved to the fluid pressure holding position. At the fluid pressure holding position, the outlet of the fluid path 33 is depart from the second port 28 so that the second port 28 is opened. On the other hand, the third port 29 is closed. The tube is intercepted between the main master cylinder 16 and the main caliper 5. Furthermore, the tube is intercepted between the main caliper 5 and the main reservoir 32. As a result, the fluid pressure is held.

At a step S123, the control device 68 stops supplying the current to the main solenoid valve 21. The main plunger 23 returns back to the basic position and the tube is again opened between the main master cylinder 16 and the main caliper 5. The high-pressure brake fluid 30 of the main master cylinder 16 again flows into the main caliper 5. Furthermore, the brake fluid 30 exhausted from the main pump 36 again flows into the main caliper 5. After the process of the step S123, the step S130 proceeds to a step S80.

At the step S130, the control device 68 judges whether or not each wheel 3 is not in the instant condition preceding the locking or the initial condition of the locking in a manner similar to each of the steps S50 and S80. When the step S130 is not satisfied, the step S130 returns back to the step S120. When the step S130 is satisfied, the brake control routines finish.

As readily understood from the above description, the wheel speed sensor 64 and the step S50 in the brake control routines executed in the control device 68 serve as a lock detecting section. The step S120 in the brake control routines serves as a main brake control section. The step S40 in the brake control routines serves as a first subsidiary brake control section. The step S70 in the brake control routines serves as a second subsidiary brake control section. The subsidiary master cylinder 41, the transmission mechanism 45, the motor 46, and the step S40 in the brake control routines executed in the control device 68 serve as a press force varying section.

As described above, the subsidiary pad 8 repeats the variation cycle of the press force while the main pad 6 presses the brake disk 4 in accordance with the depress application of the brake pedal 1 before each wheel 3 becomes the instant condition preceding the locking or the initial condition of the locking. The brake force is applied to each wheel 3 on the usual brake operation. At the same time, the brake force is applied to each wheel 3 in accordance with the intermittent brake operation of the subsidiary brake mechanism 40. At certain timing, both of the main pad 6 and the subsidiary pad 6 are applied to the brake disk 4. After this, only the subsidiary pad 8 comes off the brake disk 4. As a result, the press force is weakened. Again, the subsidiary pad 8 presses the brake disk 4. The variation cycle having the reduction and increase of the press force is repeated. The intermittent operation of the subsidiary pad 8 is similar to the usual ABS operation. It is possible to carry out both of the usual brake operation and the intermittent brake operation at the same time in case where the subsidiary pad 8 is attended to a braking system and the subsidiary pad 8 is independent of the main pad 6 in no concern to the operation of the main pad 6. Inasmuch as the number of pads is equal to two, it is possible to carry out the usual brake operation by one of the pads (main pad 6) and to carry out the intermittent brake operation by another one of the pads (subsidiary pad 8).

As described above, it is possible to carry out the intermittent brake operation similar to the ABS operation before each wheel 3 becomes the instant condition preceding the locking although the ABS operation starts in a prior art when each wheel 3 becomes the instant condition preceding the locking or the initial condition of the locking. In other words, the ABS operation or an operation similar to the ABS operation is always carried out in no concern to the instant condition preceding the locking or the initial condition of the locking while the brake pedal 1 is depressed. As a result, it is possible to resist locking in comparison to only the usual braking operation. In addition, the brake time duration and the brake distance does not become long inasmuch as a great brake force is applied to the brake disk 6, although a changeover timing speeds up at which the usual brake operation is changed into the ABS operation in the prior art. It is possible to take advantage of the characteristic of the disc brake that is representative of reducing the braking distance.

Furthermore, the variation cycle of the press force is started in the above-mention embodiment when the stop lump switch 66 detects that the brake pedal 1 is depressed. Therefore, the intermittent brake operation is started by the subsidiary brake mechanism 40 at the same time when the brake pedal 1 is depressed. Inasmuch as the intermittent brake operation is carried out at an early stage as described above, it is possible to further resist the locking of the wheels 3.

The variation cycle of the press force becomes an end on detecting the instant condition preceding the locking or the initial condition of the locking. Therefore, subsidiary brake mechanism 40 makes the intermittent brake operation become an end on detecting the instant condition preceding the locking or the initial condition of the locking. The intermittent brake operation becomes the end at the approximately same time when the usual brake operation becomes an end that is based on the depressing the brake pedal 1, and when the usual brake operation is changed into the ABS operation based on the subsidiary brake mechanism 40. As described above, the intermittent brake operation is carried out until the usual brake operation becomes the end (just before the ABS operation is started). Taking the above-mentioned description into consideration, it is possible to further resist the locking of the wheels 3.

In case of detecting the instant condition preceding the locking or the initial condition of the locking in spite of the intermittent brake operation of the subsidiary brake mechanism 40, the subsidiary brake mechanism 40 carries out the ABS operation at first before the main brake mechanism 20 carries out the ABS operation. In case of releasing the instant condition preceding the locking or the initial condition of the locking even if the subsidiary brake mechanism 40 carries out the ABS operation, the main brake mechanism 20 carries out the ABS operation. As described above, it is possible to effectively release the locking of the wheels 3 inasmuch as the ABS operation is carried out in stages.

The reverse force based on the variation of the fluid pressure is transmitted as the kickback to the brake pedal 1 in case where the main pad 6 carries out the ABS operation. This phenomenon may be similar to a phenomenon, which occurs, in the prior art. On the other hand, the reverse force based on the variation of the fluid pressure is not transmitted as the kickback to the brake pedal 1 in case where the subsidiary pad 8 carries out the intermittent brake operation and the ABS operation. In other words, the reverse force based on the variation of the fluid pressure is not transmitted as the kickback to the brake pedal 1, inasmuch as the subsidiary transmission tube 43 is independent of the main transmission tube 34 and the brake pedal 1 is directly connected to the subsidiary transmission tube 43. The fluid pressure of the subsidiary transmission tube 43 is varied on the basis of the detected result representative of detecting the fluid pressure of the main master cylinder 16 that varied in accordance with the depressing actuation of the brake pedal 1. Therefore, the reverse force based on the variation of the fluid pressure in the subsidiary transmission tube 43 is not transmitted as the kickback to the brake pedal 1. The driver does not have an unnatural feeling based on the kickback.

In the intermittent brake operation, the subsidiary pad 8 is pressed to the brake disk 4 by the press force based on the fluid pressure of the brake fluid 30 in the main transmission tube 17. The fluid pressure is varied in accordance with the depressing actuation of the brake pedal 1 which is depressed by driver. Therefore, the press force, which is applied from the subsidiary pad 8 to the brake disk 4, is varied on the basis of the depressing actuation of the brake pedal 1. When the driver operates the brake pedal 1, the method of operating the brake pedal 1 is varied in accordance with the driving condition. The method of operating the brake pedal 1 may be defined by, for example, an operating amount and an operating speed. In case where the intermittent brake operation is carried out by the subsidiary brake mechanism 40, the subsidiary pad 8 is pressed to the brake disk 4 by a force appropriate to the method of operating the brake pedal 1. Inasmuch as the intermittent brake operation is carried out by the press force corresponding to the intension of the driver, it is possible for the driver to have no unnatural feeling.

When the main pad 6 is pressed to the brake disk 4, the brake force is operated to the main pad-positioning region 9 and the brake force is also operated to the opposite region 11 in order to keep a balance. It will be assumed that the subsidiary pad 8 is pressed to the brake disk 4 when the subsidiary pad 8 is positioned at the opposite region 11 and when the main pad 6 is pressed to the brake disk 4. The brake forces based on the main pad 6 and the subsidiary pad 8 are operated to a same region at the same time (intensively). An excessive force, which is greater than a sum of both of brake forces, is operated to the brake disk 4 by a synergistic effect of both of brake forces so that the locking may occur.

On the other hand, the subsidiary pad 8 is positioned at a region (intermediate region 12) different from the opposite region 11 in the above-mentioned embodiment. Accordingly, the brake force based on the subsidiary pad 8 is operated in a region (subsidiary pad positioning region 13) different from regions (main pad positioning region 9 and opposite region 11) in which the brake force based on the main pad 6 is operated. The brake forces based on the main pad 6 and the subsidiary pad 8 are scattered so that the brake forces are operated to the brake disk 4. The synergistic effect does not occur which is based on the above-mentioned interference between both of the brake forces. Even if both of the main and the subsidiary pads 6 and 8 are pressed to the brake disk 4 at the same time, the force greater than the sum of both of the brake forces is never operated to the brake disk 4. Therefore, it is possible to prevent the brake disk 4 from the excessive force. Furthermore, it is possible to prevent the occurrence of the locking.

The intermediate region 12 is divided into a first region and a second region. The first region is located near the opposite region 11. The second region is located near the main pad-positioning region 9. The first region will be called the subsidiary pad-positioning region 13. The second region will be called the heat suction region 14. The heat suction region 14 is always exposed in no concern to the operations of both of the main and the subsidiary pads 6 and 8 to carry out a heat radiation (cooling). Under the circumstances, it is possible to effectively cool the brake disk 4 and both of the main and the subsidiary pads 6 and 8, inasmuch as the heat, which is caused by the friction between the brake disk 4 and the main pad 6 and/or between the brake disk 4 and the subsidiary pad 8, is rapidly dissipated from the heat suction region 14 to the atmosphere. Even if the brake is heavily used, it is possible to prevent damages based on the frictional heat. One of the damages is a fading phenomenon in which a friction coefficient (effect of the brake) gradually decreases as the temperature of the friction surface becomes a high temperature. Namely, it is possible to prevent the occurrence of the fading phenomenon.

Inasmuch as the locking is easy to occur in the harsh braking in comparison with an usual braking, the ABS operation is carried out immediately by the main brake mechanism 20, omitting the intermittent brake operation and the ABS operation both of which are carried by the subsidiary brake mechanism 40. Therefore, it is possible to hardly make the locking in the harsh braking. Even if the locking occurs, it is possible to make the locking become an end at an early stage. It is possible to sufficiently deal with the excessive depression of the brake pedal 1 on emergency.

Inasmuch as the motor 46 is used as the power source of the subsidiary master cylinder 41, it is possible to obtain a rapid response on supplying the current to the motor 46 and on stopping supply of current to the motor 46. Furthermore, it is possible to easily make fine adjustments of a stroke of the subsidiary push rod 44 on reciprocation.

Inasmuch as the subsidiary pad 8 carries out the braking operation together with the main pad 8, it is possible to reduce a load, which is applied to the main pad 6. As a result, the main pad 6 has a high degree of flexibility in a design such as a layout.

In general, an operating noise occurs in the ABS operation. The operating noise may be based on a vibration and a sound based on a dynamic variation of the fluid pressure, a transmission of a vibration of the fluid pressure unit, and a sound generating from the fluid pressure unit. The number of the ABS operations reduces in comparison with the conventional anti-lock brake apparatus which does not have the subsidiary brake mechanism 40, inasmuch as the locking of the wheels hardly occurs in the above-mentioned embodiment as described above. Inasmuch as the ABS operations reduce in number, it is possible to reduce the operating noise in the ABS operation.

The brake control apparatus according to the above-mentioned embodiment may be used in combination with another apparatus or other apparatuses. More particularly, the brake control apparatus may be used in combination with a traction control apparatus, which is for use in preventing each of driving wheels from a freewheeling condition, on starting the vehicle or on accelerating the vehicle on the slippery road surface. Furthermore, the brake control apparatus may be used in combination with a vehicle stability control apparatus which for use in avoiding a sideslip of the vehicle that is based on a strong over-steering or a strong under-steering, when the vehicle runs on a curve in a road. As a result, it is possible to reduce the load, which is applied to the main brake mechanism 20.

At least one of the starting condition and the ending condition may be changed into another condition, which is different from the conditions described in the above-mentioned embodiment. The starting condition is representative of starting the variation cycle of the press force based on the subsidiary pad 8. The ending condition is representative of ending the variation cycle of the press force based on the subsidiary pad 8. More specifically, the variation cycle may be start when a first predetermined time duration lapses after the stop lump switch 66 detects the depression of the brake pedal 1. The variation cycle may be ended when a second predetermined time duration lapses after the first predetermined time duration lapses.

The ABS operation may be omitted which is carried out by the subsidiary brake mechanism 40. In this case, the ABS operation is carried out by the main brake mechanism 20 when detection is made about the instant condition preceding the locking or the initial condition of the locking.

Although the stroke of the subsidiary push rod 44 is varied on the basis of the fluid pressure of the main master cylinder 16 in the above-mentioned embodiment, the subsidiary push rod 44 may be always reciprocated in a same stroke in no concern to the fluid pressure of the main master cylinder 16.

As described above, it is possible to hardly make the locking of the wheels without increasing the braking time duration and the braking distance according to claim 1 of this invention.

According to claim 2 of this invention, it is possible to further prevent the wheels from locking in addition to the effect according to claim 1 of this invention, inasmuch as the intermittent brake operation is carried out by the subsidiary brake mechanism at the early stage.

According to claim 3 of this invention, it is possible to further prevent the wheels from locking in addition to the effect according to claim 1 or 2 of this invention inasmuch as the intermittent brake operation is carried out by the subsidiary brake mechanism until the wheel become the instant condition preceding the locking or the initial condition of the locking.

According to claim 4 of this invention, it is possible to effectively release the locking of the wheels in addition to the effect according to any one of claims 1 to 3 of this invention inasmuch as the anti-lock brake operation is carried out in stages.

According to claim 5 of this invention, it is possible to prevent the occurrence of the kickback when the intermittent brake operation or the anti-lock brake operation is carried out by the subsidiary brake mechanism, in addition to the effect according to any one of claims 1 to 4 of this invention.

According to claim 6 of this invention, it is possible to carry out the intermittent brake operation by using the subsidiary brake mechanism with the press force having a desired force which the driver wants, in addition to the effect according to claim 5 of this invention. Therefore, the driver does not have the unnatural feeling.

According to claim 7 of this invention, it is possible to prevent the brake disk from the excessive brake force when the both of the main and the subsidiary pads are pressed to the brake disk at the same time, in addition to the effect according to any one of claims 1 to 6 of this invention. As a result, it is possible to prevent the wheel from locking inasmuch as the subsidiary pad is used.

According to claim 8 of this invention, it is possible to effectively cool the brake disk, the main pad, and the subsidiary pad in addition to the effect according to claim 7 of this invention.

While this invention has thus far been described in conjunction with the preferred embodiment thereof, it will readily be possible for those skilled in the art to put this invention into practice in various other manners.

What is claimed is:

1. A brake control apparatus, comprising:
   a) a brake disk rotatable with a wheel;
   b) a main brake mechanism for pressing a main friction member to said brake disk in accordance with an operation of a brake operating member to brake the wheel;

c) lock detecting means for detecting a wheel condition at an instant preceding wheel locking or a wheel condition when wheel locking initiates, said lock detecting means producing a lock detection signal corresponding to the wheel condition detected;

d) main brake control means for controlling said main brake mechanism to make said main brake mechanism temporarily reduce a main press force which is applied from said main friction member to said brake disk;

e) a subsidiary brake mechanism for pressing a subsidiary friction member to said brake disk to brake said wheel; and f) first subsidiary brake control means for controlling said subsidiary brake mechanism to make said subsidiary brake mechanism repeat a variation cycle during the operation of said brake operating member before said first subsidiary brake control means receives said lock detection signal, said subsidiary brake mechanism increasing a subsidiary press force after reducing said subsidiary press force in said variation cycle, said subsidiary press force being applied from said subsidiary friction member to said brake disk.

2. A brake control apparatus as claimed in claim 1, wherein said brake control apparatus further comprises:

a) brake operation detecting means for detecting the operation of said brake operating member to produce a brake operating detection signal; and b) said first subsidiary brake control means controlling said subsidiary brake mechanism to make said subsidiary brake mechanism start said variation cycle when said first subsidiary brake control means receives said brake operating detection signal.

3. A brake control apparatus as claimed in claim 1, wherein:

a) said first subsidiary brake control means controls said subsidiary brake mechanism to make said subsidiary brake mechanism finish said variation cycle when said first subsidiary brake control means receives said lock detection signal.

4. A brake control apparatus as claimed in claim 1, wherein, said brake control apparatus further comprises:

a) a second subsidiary brake control means for controlling said subsidiary brake mechanism to make said subsidiary brake mechanism repeat said variation cycle on receiving said lock detection signal before said main brake control means starts controlling said main brake mechanism after said first subsidiary brake control means finishes controlling said subsidiary brake mechanism.

5. A brake control apparatus as claimed in claim 1, wherein:

a) said main brake mechanism comprises a main transmission tube for use in transmitting a fluid pressure to said main friction member based on the operation of said brake operating member; and b) said subsidiary brake mechanism includes a subsidiary transmission tube for use in transmitting the fluid pressure to said subsidiary friction member to operate said subsidiary friction member in accordance with said fluid pressure.

6. A brake control apparatus as claimed in claim 5, wherein:

a) a fluid pressure detecting device is provided for detecting said fluid pressure in said main transmission tube to produce a pressure detection signal representative of said fluid pressure; and b) said first subsidiary brake control includes a press force varying device for varying said subsidiary press force in accordance with said pressure detection signal.

7. A brake control apparatus as claimed in claim 5, wherein:

a) said brake control apparatus further comprises fluid pressure detecting means for detecting said fluid pressure in said main transmission tube to produce a pressure detection signal representative of said fluid pressure; and b) said first subsidiary brake control means includes press force varying means for varying said subsidiary press force in accordance with said pressure detection signal.

8. A brake control apparatus as claimed in claim 1, wherein:

a) said main friction member is positioned at a main region of said brake disk; and b) said subsidiary friction member is positioned at an intermediate region of said brake disk, said intermediate region being different from said main region and an opposite region which is opposed to said main region across a rotation center of said brake disk.

9. A brake control apparatus as claimed in claim 8, wherein:

a) said subsidiary friction member is positioned near said opposite region in said intermediate region.

10. A brake control apparatus as claimed in claim 2, wherein:

a) said first subsidiary brake control means controls said subsidiary brake mechanism to make said subsidiary brake mechanism finish said variation cycle when said first subsidiary brake control means receives said lock detection signal.

11. A brake control apparatus as claimed in claim 10, wherein:

a) said brake control apparatus further comprises a second subsidiary brake control means for controlling said subsidiary brake mechanism to make said subsidiary brake mechanism repeat said variation cycle on receiving said lock detection signal before said main brake control means starts controlling said main brake mechanism after said first subsidiary brake control means finishes controlling said subsidiary brake mechanism.

12. A brake control apparatus as claimed in claim 11, wherein:

a) said main brake mechanism comprises a main transmission tube for use in transmitting a fluid pressure to said main friction member based on the operation of said brake operating member; and b) said subsidiary brake mechanism includes a subsidiary transmission tube for use in transmitting fluid pressure to said subsidiary friction member to operate said subsidiary friction member in accordance with said fluid pressure.

13. A brake control apparatus as claimed in claim 12, wherein:

a) said brake control apparatus further comprises fluid pressure detecting means for detecting said fluid pressure in said main transmission tube to produce a pressure detection signal representative of said fluid pressure; and b) said first subsidiary brake control means includes press force varying means for varying said subsidiary press force in accordance with said pressure detection signal.

14. A brake control apparatus as claimed in claim 13, wherein:
   a) said main friction member is positioned at a main region of said brake disk; and
   b) said subsidiary friction member is positioned at an intermediate region of said brake disk, said intermediate region being different from said main region and an opposite region which is opposed to said main region across a rotation center of said brake disk.

15. A brake control apparatus as claimed in claim 14, wherein:
   a) said subsidiary friction member is positioned near said opposite region in said intermediate region.

16. A brake control apparatus as claimed in claim 2, wherein:
   a) said brake control apparatus further comprises a second subsidiary brake control means for controlling said subsidiary brake mechanism to make said subsidiary brake mechanism repeat said variation cycle on receiving said lock detection signal before said main brake control means starts controlling said main brake mechanism after said first subsidiary brake control means finishes controlling said subsidiary brake mechanism.

17. A brake control apparatus, comprising:
   a) a brake disk rotatable with a wheel;
   b) a main brake mechanism for pressing a main friction member to said brake disk in accordance with an operation of a brake operating member to brake the wheel;
   c) a lock detector, said lock detector being configured for detecting a wheel condition at an instant preceding wheel locking or a wheel condition when wheel locking initiates, said lock detector producing a signal corresponding to the wheel condition detected;
   d) a main brake control, said main brake control being configured for controlling said main brake mechanism to make said main brake mechanism temporarily reduce a main press force which is applied from said main friction member to said brake disk;
   e) a subsidiary brake mechanism for pressing a subsidiary friction member to said brake disk to brake said wheel; and
   f) a first subsidiary brake control, said first subsidiary brake control being configured for controlling said subsidiary brake mechanism to make said subsidiary brake mechanism repeat a variation cycle during the operation of said brake operating member before said first subsidiary brake control means receives said lock detection signal, said subsidiary brake mechanism increasing a subsidiary press force after reducing said subsidiary press force in said variation cycle, said subsidiary press force being applied from said subsidiary friction member to said brake disk.

18. A brake control apparatus as claimed in claim 7, wherein said brake control apparatus further comprises:
   a) a brake operation detecting device is provided for detecting the operation of said brake operating member to produce a brake operating detection signal; and
   b) said first subsidiary brake control controlling said subsidiary brake mechanism to make said subsidiary brake mechanism start said variation cycle when said first subsidiary brake control receives said brake operating detection signal.

19. A brake control apparatus as claimed in claim 17, wherein:
   a) said first subsidiary brake control controls said subsidiary brake mechanism to make said subsidiary brake mechanism finish said variation cycle when said first subsidiary brake control receives said lock detection signal.

20. A brake control apparatus as claimed in claim 17, wherein:
   a) a second subsidiary brake control is provided for controlling said subsidiary brake mechanism to make said subsidiary brake mechanism repeat said variation cycle on receiving said lock detection signal before said main brake control starts controlling said main brake mechanism after said first subsidiary brake control finishes controlling said subsidiary brake mechanism.

21. A brake control apparatus as claimed in claim 17, wherein:
   a) said main brake mechanism includes a main transmission tube for use in transmitting a fluid pressure to said main friction member based on the operation of said brake operating member; and
   b) said subsidiary brake mechanism includes a subsidiary transmission tube for use in transmitting the fluid pressure to said subsidiary friction member to operate said subsidiary friction member in accordance with said fluid pressure.

22. A brake control apparatus as claimed in claim 17, wherein:
   a) said main friction member is positioned at a main region of said brake disk; and
   b) said subsidiary friction member is positioned at an intermediate region of said brake disk, said intermediate region being different from said main region.

* * * * *